United States Patent

Staiger

(10) Patent No.: US 12,052,639 B2
(45) Date of Patent: Jul. 30, 2024

(54) MEASURING DEVICE FOR PROCESS AUTOMATION IN AN INDUSTRIAL ENVIRONMENT

(71) Applicant: VEGA GRIESHABER KG, Wolfach (DE)

(72) Inventor: Holger Staiger, Hardt (DE)

(73) Assignee: VEGA GRIESHABER KG, Wolfach (DE)

( * ) Notice: Subject to any disclaimer, the term of this patent is extended or adjusted under 35 U.S.C. 154(b) by 307 days.

(21) Appl. No.: 17/455,358

(22) Filed: Nov. 17, 2021

(65) Prior Publication Data

US 2022/0159424 A1    May 19, 2022

(30) Foreign Application Priority Data

Nov. 19, 2020  (DE) .................. 10 2020 130 622.9

(51) Int. Cl.
*H04W 4/38* (2018.01)
*H04L 67/12* (2022.01)

(52) U.S. Cl.
CPC ............. *H04W 4/38* (2018.02); *H04L 67/12* (2013.01)

(58) Field of Classification Search
CPC ........ H04W 4/38; H04L 67/12; H04L 67/125; G01D 21/02; G08C 17/02
See application file for complete search history.

(56) References Cited

U.S. PATENT DOCUMENTS

| | | | |
|---|---|---|---|
| 11,118,938 B2 | 9/2021 | Schmidt et al. | |
| 2009/0326683 A1 | 12/2009 | Gerstmaier et al. | |
| 2011/0299470 A1 | 12/2011 | Müller et al. | |
| 2016/0170394 A1* | 6/2016 | Allgaier | H04L 67/12 702/188 |
| 2019/0234640 A1* | 8/2019 | Nemcek | H04L 12/2803 |
| 2019/0335379 A1* | 10/2019 | Joseph | H04W 28/06 |
| 2020/0053792 A1* | 2/2020 | Ryu | H04W 74/0833 |
| 2020/0196031 A1 | 6/2020 | Joppich-Dohlus et al. | |
| 2020/0329529 A1 | 10/2020 | Tsai et al. | |
| 2021/0176697 A1* | 6/2021 | Lu | H04W 48/18 |
| 2021/0344566 A1 | 11/2021 | Mayer et al. | |

FOREIGN PATENT DOCUMENTS

| | | |
|---|---|---|
| DE | 10 2007 007 537 A1 | 8/2008 |
| DE | 10 2009 009 189 B4 | 6/2011 |
| DE | 10 2011 086 726 A1 | 5/2013 |

(Continued)

OTHER PUBLICATIONS

Written Opinion issued Jul. 13, 2021, in PCT/EP2020/082743, English translation Only. (5 pages).

(Continued)

*Primary Examiner* — Fred A Casca
(74) *Attorney, Agent, or Firm* — Oblon, McClelland, Maier & Neustadt, L.L.P.

(57) ABSTRACT

A measuring device and method for process automation in an industrial environment. The measuring device includes a radio module having a first radio channel that transmits measurement data, a second radio channel that transmits the measurement data, and control circuitry that controls the first radio channel and the second radio channel in such a way that identical measurement data is transmitted by the two radio channels.

14 Claims, 2 Drawing Sheets

(56) References Cited

FOREIGN PATENT DOCUMENTS

| | | |
|---|---|---|
| DE | 10 2018 009 818 A1 | 6/2020 |
| DE | 10 2018 009 821 A1 | 6/2020 |
| EP | 2 311 180 A1 | 4/2011 |
| WO | WO 2010/002464 A1 | 1/2010 |
| WO | WO 2020/126288 A1 | 6/2020 |

OTHER PUBLICATIONS

German Office Action issued Sep. 15, 2021, in German Patent Application No. 102020130622.9, machine English Translation Only. (7 pages).

* cited by examiner

MEASURING DEVICE FOR PROCESS AUTOMATION IN AN INDUSTRIAL ENVIRONMENT

CROSS-REFERENCE TO RELATED APPLICATIONS

This application claims the benefit of the filing date of German Patent Application No. 10 2020 130 622.9 filed on 19 Nov. 2020, the entire content of which is incorporated herein by reference.

FIELD

The disclosure relates to process measurement technology and process automation in an industrial environment. In particular, the disclosure relates to a measuring device configured for process automation in an industrial environment, the use of a measuring device for level measurement, limit level measurement, flow measurement or pressure measurement in process automation in an industrial environment, the use of a measuring device for redundant data transmission from the measuring device to a receiver or a cloud system by way of a radio module having a first radio channel and a second radio channel, a method, a program element and a computer-readable medium.

BACKGROUND

In the modern process industry and factory automation, many field devices/measuring devices are often installed in complex plants in a stationary or mobile, distributed manner. Typically, measurement, parameterization, and diagnostic data as well as other user data of the field devices can be exchanged between the field devices and a receiver, such as a mobile communication device, either wired, for example via a control or bus system, or wireless, for example via a Bluetooth or WLAN communication link. Especially in the context of Industry 4.0 or Industrial Internet of Things (IIoT), the intelligent networking of field devices is gaining in importance, and especially in the wireless communication environment.

SUMMARY

There may be a desire to provide an alternative to known wireless data communication.

A first aspect of the present disclosure relates to a measuring device arranged for process automation in an industrial environment. The measuring device comprises a radio module having a first radio channel configured to transmit measurement data, a second radio channel configured to transmit the same measurement data, and a control unit. The control unit is arranged to control the first radio channel and the second radio channel in such a way that identical data is transmitted by the two radio modules.

The measuring device can be set up to carry out the transmission of the measurement data in the form of unidirectional radio communication.

According to a further embodiment, the measuring device is a level meter, a flow meter, a pressure meter or a limit level meter.

According to a further embodiment, the control unit is configured to always instruct the first radio channel and the second radio channel to send the measurement data regardless of data received.

Since the redundant sending of the measurement data by means of the first radio channel and the second radio channel can increase the reliability of the data transmission from the measuring device to a receiver, the provision of a return channel in the measuring device can be dispensed with. Advantageously, this may avoid or at least minimize latency of further data transmission. In this case, the communication is thus unidirectional.

According to a further embodiment, the first radio channel of the radio module is configured to transmit the measurement data via a different radio technology than the second radio module.

The measuring device can be set up to transmit the same measurement data redundantly or repeatedly by means of the first radio channel and the second radio channel from the measuring device to an external receiver or a receiving device. Two redundant communication channels or radio channels may be provided integrated in one measuring device.

By redundantly sending the measurement data using the first and second radio channels, the chance of successfully transmitting the measurement data to a receiver or a cloud system may be increased by allowing the at least one data packet to reach the receiver through the first radio channel or the second radio channel.

According to another embodiment, the first radio channel is an LPWAN radio channel, while the second radio channel is a cellular radio channel.

An LPWAN radio channel is a radio channel in a low power wide area network using low frequency narrow band radio technology.

According to another embodiment, the LPWAN radio channel is a LoRa, Sigfox, NB-IoT or Mioty radio channel.

The LPWAN radio channel may be formed as a LoRa, NB-IoT, Mioty, Dect ULE, Symphony Link, Weightless, WiFi HaLow, or CAT-M radio channel within a standard disclosed technology.

Alternatively, the LPWAN radio channel may be formed as a Sigfox, WavIoT or an RPMA radio channel within a proprietary process.

The LPWAN radio channel may be set up to transmit the measurement data over a license-free band in a private radio network. For example, the LPWAN radio channel may be the LoRa or LoRa WAN, Mioty, Symphony Link, Weightless, WiFi HaLow radio channel.

Furthermore, the LPWAN radio channel may be arranged to transmit the measurement data over a license-free band, for example as a LoRa WAN or Sigfox radio channel, or over a licensed band, for example as a NB-IoT or CAT-M radio channel, in a public radio network.

According to another embodiment, the first radio channel is a LoRa radio channel, while the second radio channel is an LPWAN radio channel that is not a LoRa radio channel.

The first radio channel and the second radio channel may thus be two different LPWAN radio channels According to another embodiment, the LPWAN radio channel is configured to transmit the measurement data at a radio frequency below 1 GHz or 1 MHz.

According to a further embodiment, the LPWAN radio channel is configured to send the measurement data with a range of up to 50 km.

For example, the LPWAN radio channel may be set up to send the measurement data with a range of at least 50 meters. The relatively long range may advantageously allow the data to be sent in a large operational process plant.

For example, the LPWAN radio channel may be configured to transmit the measurement data at a rate of 100 kbps to 1 Mbps. With the relatively small data rate, the LPWAN radio channel can effectively and efficiently suppress noise, for example. This can advantageously improve the building penetration of the radio signal.

In addition, the sending of the measurement data or the data transmission by means of the LPWAN radio channel can take place with a relatively large latency.

According to a further embodiment, the measuring device is configured to transmit the measurement data in immediate succession or simultaneously by means of the first radio channel and the second radio channel.

The measuring device or the control unit of the radio module may be configured to synchronize the first radio channel and the second radio channel for transmitting the measurement data. Performing the transmission of the measurement data through the first radio channel and the second radio channel simultaneously may advantageously lead to a reduction of the time required for the entire radio transmission.

The measuring device may be a stand-alone measuring sensor. The measuring device may have an internal power supply configured as a rechargeable battery or a battery or a solar panel and configured to provide the power required to operate the stand-alone measuring sensor.

For example, the measuring device may be configured for a wireless battery-powered system in a regional, national or even global network. Using the LPWAN radio channel as the first radio channel and/or the second radio channel, the measurement device may also be configured to transmit data with a low transmission power. Using low frequency narrow band radio technology, the measuring device with the LPWAN radio module can be available at a low cost and with low power consumption by integration in commercially available semiconductor devices.

Compared to wired communication, where the energy required for measurement should always be in use, the availability of more advanced, energy-saving wireless technologies means that battery-powered sensors may become increasingly important, for example for monitoring level, limit level or pressure values. Particular advantages arise for applications in the field of process automation in industrial environments such as logistics.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

A subarea of process automation in the industrial environment concerns logistics automation. With the help of distance and angle sensors, processes within a building or within an individual logistics facility are automated in the area of logistics automation. Typical applications are, for example, systems for logistics automation in the field of baggage and freight handling at airports, in the field of traffic monitoring (toll systems), in retail, parcel distribution or also in the field of building security (access control). What is meant by the examples listed above is that presence detection in combination with precise measurement of the size and position of an object is required by the respective application side. Sensors based on optical measurement methods using lasers, LEDs, 2D cameras or 3D cameras that measure distances according to the time-of-flight (ToF) principle can be used for this purpose.

Another subarea of process automation in the industrial environment concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

With the LPWAN radio channel, for example a LoRa radio channel, the measuring device can be set up to perform the transmission of the measurement data in an energy-saving manner.

The control unit may be configured to switch the measuring instrument to a sleep mode immediately after sending the measurement data.

The control unit may further be configured to switch the measuring device to the sleep mode without waiting for response of the received data to further save power. For example, the measuring device having the LoRa radio channel and the cellular radio channel may be arranged to dispense with acknowledging receipt of the transmitted measurement data from a receiving device by means of the control unit immediately after the measurement data is transmitted, or to disable the transmission of the measurement data. Since the sending of data via the first and second radio channels can be carried out simultaneously, the measuring device can be switched to the sleep state correspondingly faster.

This can advantageously result in a low data volume when sending the measurement data by means of the measuring device.

Alternatively, the device or meter may be set up to put only the LoRa radio channel into sleep mode without a "reception confirmed" mode of operation.

Advantageously, this allows the measuring device with the sleep mode to not constantly occupy the limited airspace in the process plant and to avoid interfering with further communication modes or further communication between a further measuring device and a receiving device in the process plant in the same frequency spectrum. This allows data communication to occur without interference or at least with reduced interference.

The mobile radio channel may be a 5G mobile radio channel and may be configured to transmit the measurement data, for example, at a data rate of up to 10 GBit/s with a short latency and a high richness. Alternatively or additionally, the mobile radio channel may be a 3G mobile radio channel or a 4G mobile radio channel.

The mobile radio channel may be set up to send the data communication via the mobile radio in the form of a non-IP-based data transmission without the reception of the measurement data being acknowledged by the receiving device.

The LPWAN radio channel may be provided in combination with a cellular radio channel for redundant data transmission or data transfer. Further, two different radio communication technologies may be combined or integrated in a measurement device to send or transmit the measurement data in the field to the outside world on different frequencies and/or by using different protocols. Furthermore, another radio channel may be provided in the measurement device to further increase the reliability of the data communication.

According to a further embodiment, the radio module of the device comprises a first radio unit having the first radio channel, and a second radio unit having the second radio channel The first radio unit and the second radio unit may thus be integrated in a single radio module.

Another aspect relates to the use of a measurement device for level measurement, limit level measurement, flow measurement or pressure measurement in process automation in an industrial environment.

Another aspect relates to using a measuring device to redundantly transmit data from the meter to a receiver or cloud system using a radio module comprising a first radio module and a second radio module.

A receiver or receiving device or cloud system may be provided in an IoT system and may be arranged to receive the measurement data sent by the measurement device simultaneously and redundantly over the first radio channel and the second radio channel.

Another aspect relates to a method of transmitting data from a measurement device to an external receiver. The method comprises the steps of: transmitting measurement data through a first radio channel, transmitting the measurement data through a second radio channel, and driving the first radio channel and the second radio channel such that identical measurement data is transmitted from the two radio channels.

Another aspect relates to a program element that, when executed on a control unit of a measuring device, instructs the measuring device to perform the steps of: transmitting measurement data through a first radio channel of a radio module, transmitting the measurement data through a second radio channel of the radio module, and driving the first radio channel and the second radio channel such that identical measurement data is transmitted from the two radio channels.

Another aspect relates to a computer-readable medium on which a program element is stored.

In the following, embodiments of the present disclosure are described with reference to the figures. If the same reference signs are used in the figure description, these describe the same or similar elements. The illustrations in the figures are schematic and not to scale.

DETAILED DESCRIPTION OF EMBODIMENTS

Figure 1:
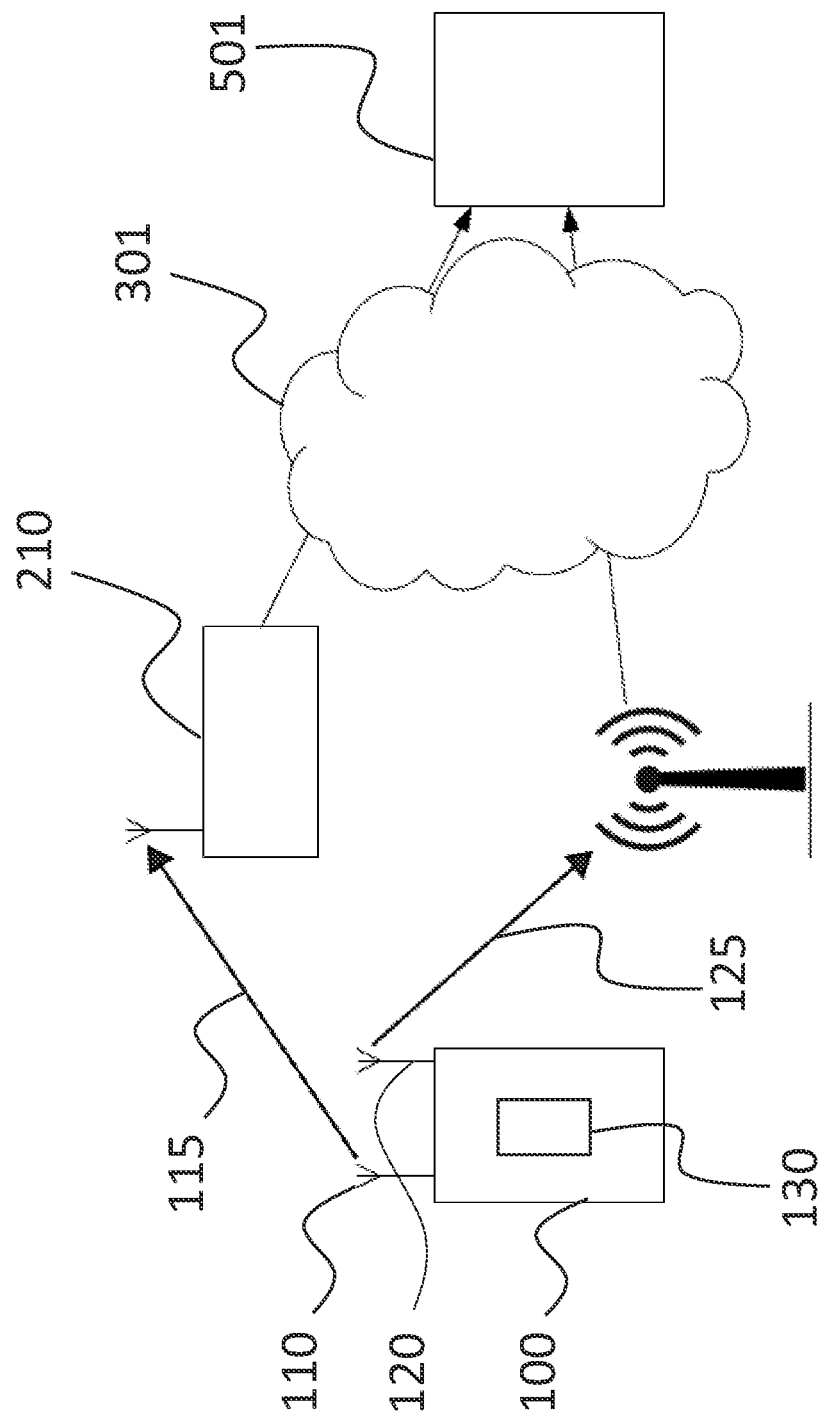
FIG. 1 shows a schematic representation of a measuring device for data communication according to one embodiment.

FIG. 1 shows a measuring device 100, which is configured for process automation in an industrial environment or in an IoT system and comprises a radio module having a first radio channel 110, a second radio module 120 and a control unit 130.

The measuring device 100 may be a level meter, a flow meter, a pressure meter, or a limit level meter.

The first radio channel 110 may be an LPWAN radio channel, in particular a LoRa radio channel, that is set up to transmit the measurement data, while the second radio channel 120 may be a cellular radio channel that is, for example, a 5G cellular radio channel and may be set up to transmit the measurement data. Alternatively, the second radio channel 120 may be an LPWAN radio channel that is different from the LPWAN radio channel of the first radio channel.

The control unit (circuitry) 130 is configured to control the first radio channel 110 and the second radio channel 120 such that identical measurement data is sent from the two radio channels 110, 120. Furthermore, the control unit 130 is arranged to send the identical measurement data simultaneously from the first radio channel and the second radio channel.

For example, the measurement device 100 may be configured to send or transmit the measurement data at once in a first data packet 115 over the first LPWAN radio channel or the LoRa radio channel 110 and in a second data packet 125 over the second cellular radio channel to a cloud system 301 or a server or a receiver 501. The first data packet 115 and the second data packet 125 may have an identical identifier that allows the receiver 501 or the cloud system 301 to identify the redundantly transmitted measurement data.

In this regard, the measurement data may be transmitted through the LPWAN radio channel 110 and the cellular radio channel 120 with a long range up to, for example, 50 km. Thereby, sending the measurement data through the LPWAN radio channel 110 can be done with a low power consumption and a relatively high latency.

The control unit 130 may be configured to switch the measuring device 100 to a sleep mode immediately after sending the measurement data, without waiting for a response of the received data, in order to further save energy. Thus, a low data volume may advantageously result when sending the measurement data by means of the measurement device 100.

By combining two or more different radio communication technologies for redundant data transmission or data transfer, the measurement device 100 can advantageously be used with increased reliability of data communication in an industrial environment for process automation or in an industrial IoT (IIoT) system.

The measurement device may comprise an antenna, which may be arranged to send the measurement data from the first radio channel and the second radio channel of the radio module via the single, common antenna. Alternatively or additionally, the measurement device 100 may comprise a second antenna to send the measurement data respectively via second separate antenna.

Figure 2:
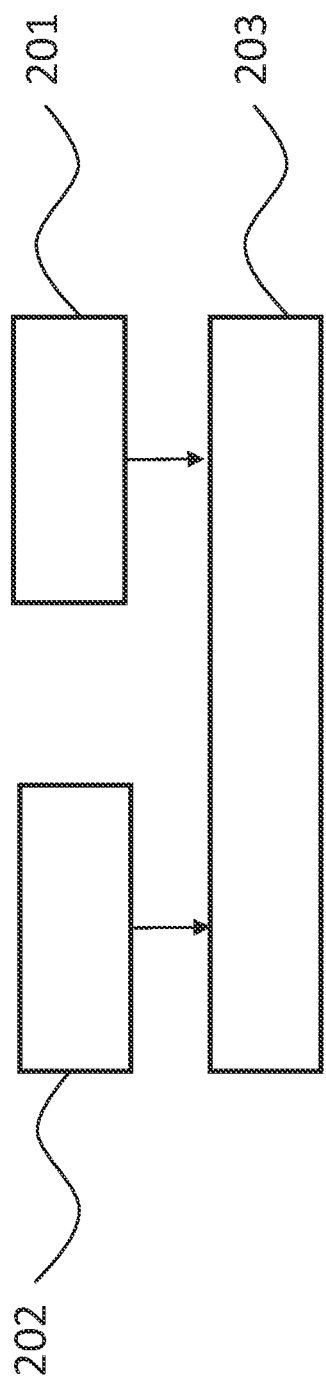
FIG. 2 shows a flow diagram of a process according to one embodiment.

FIG. 2 shows a flowchart of a method for transmitting data from a measuring device 100 to an external receiver. In step 201, measurement data of a measurement device 100 is transmitted through a first radio channel 110. In step 201, measurement data from the measurement device 100 is transmitted through a second radio channel 120. In step 203, driving the first radio channel 110 and the second radio channel 120 may be performed such that identical measurement data is sent from the two radio channels 110, 120.

Furthermore, the triggering of the first radio channel 110 and the second radio channel 120 may be carried out in such a way that the measurement data is sent in immediate succession or simultaneously by means of the first radio channel 110 and the second radio channel 100.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A level measuring device, flow measuring device, pressure measuring device or limit level measuring device, configured for process automation in an industrial environment, comprising:
    a radio module, the radio module including:
        a first radio channel, configured to transmit measurement data, and
        a second radio channel, configured to transmit the measurement data; and
    control circuitry configured to control the first radio channel and the second radio channel in such a way that identical measurement data are transmitted by both the first and the second radio channel,
    wherein the first radio channel is configured to transmit the measurement data via a different radio technology than the second radio channel.

2. The measuring device according to claim 1,
    wherein the control circuitry is configured to always instruct the first radio channel and the second radio channel to send the measurement data, independently of received data.

3. The measuring device according to claim 1,
    wherein the first radio channel is an LPWAN radio channel, and
    wherein the second radio channel is a mobile radio channel.

4. The measuring device according to claim 3,
    wherein the LPWAN radio channel is a LoRa, Sigfox, NB-IoT or Mioty radio channel.

5. The measuring device according to claim 1,
    where the first radio channel is a LoRa radio channel; and
    where the second radio channel is an LPWAN radio channel that is not a LoRa radio channel.

6. The measuring device according to claim 3,
    wherein the LPWAN radio channel is configured to transmit the measurement data at a radio frequency below 1 GHz or 1 MHz.

7. The measuring device according to claim 3,
    wherein the LPWAN radio channel is configured to transmit the measurement data with a range of up to at least 50 km.

8. The measuring device according to claim 1,
    wherein the measuring device is configured to transmit the measurement data immediately successively or simultaneously by way of the first radio channel and the second radio channel.

9. The measuring device according to claim 1,
    wherein the radio module comprises a first radio including the first radio channel and a second radio including the second radio channel.

10. The measuring device according to claim 2,
    where the first radio channel is a LoRa radio channel; and
    where the second radio channel is an LPWAN radio channel that is not a LoRa radio channel.

11. The measuring device according to claim 4,
    wherein the LPWAN radio channel is configured to transmit the measurement data at a radio frequency below 1 GHz or 1 MHz.

12. The measuring device according to claim 5,
    wherein the LPWAN radio channel is configured to transmit the measurement data at a radio frequency below 1 GHz or 1 MHz.

13. A method of transmitting data from a level measuring device, a flow measuring device, a pressure measuring device or a limit level measuring device, to an external receiver, comprising:
    transmitting measurement data through a first radio channel of a radio module via a first radio technology;
    transmitting the measurement data by a second radio channel of the radio module via a second radio technology, which is different to the first radio technology; and
    controlling the first radio channel and the second radio channel in such a way that identical measurement data are transmitted by the first and second radio channels.

14. A non-transitory computer readable medium having program element which, when executed on control circuitry of a level measuring device, a flow measuring device, a pressure measuring device or a limit level measuring device, instructs the level measuring device, the flow measuring device, the pressure measuring device or the limit level measuring device to perform a method comprising:
    transmitting measurement data through a first radio channel of a radio module via a first radio technology;
    transmitting the measurement data through a second radio channel of the radio module via a second radio technology, which is different to the first radio technology; and
    controlling the first radio channel and the second radio channel in such a way that identical measurement data are transmitted by the first and second radio channels.

* * * * *